Dec. 20, 1955   A. D. ROSE ET AL   2,727,389
TEMPERATURE GAUGE
Filed Oct. 28, 1950   2 Sheets-Sheet 1

INVENTORS:
Alexander D. Rose
Bernhard Willach
BY
Thiess, Olson & Mecklenburger
Att'ys Dec. 20, 1955  A. D. ROSE ET AL  2,727,389
TEMPERATURE GAUGE
Filed Oct. 28, 1950  2 Sheets-Sheet 2

INVENTORS:
Alexander D. Rose
Bernhard Willach
BY
Thiess, Olson & Mecklenburger
Attys United States Patent Office 2,727,389
Patented Dec. 20, 1955

2,727,389

TEMPERATURE GAUGE

Alexander D. Rose, Park Ridge, and Bernhard Willach, Chicago, Ill., assignors to Jas. P. Marsh Corporation, Skokie, Ill., a corporation of Illinois Application October 28, 1950, Serial No. 192,774

4 Claims. (Cl. 73—367)

The present invention relates to a temperature gauge and has special reference to a temperature gauge which may be combined with a pressure gauge.

An object of the present invention is to provide a bottom connection type gauge having a temperature responsive element shaft and an indicating shaft substantially normal thereto, with transmission means between said shafts for effecting rotation of the indicating shaft in accordance with the rotation of the temperature shaft, while permitting longitudinal movement of the temperature shaft due to the action of the temperature responsive means connected thereto.

Another object is to produce an accurate, inexpensive, rugged, efficient gauge of the type hereinabove referred to.

Further objects and advantages will be apparent from the following description and claims when considered with the drawings, in which:

Figure 1:
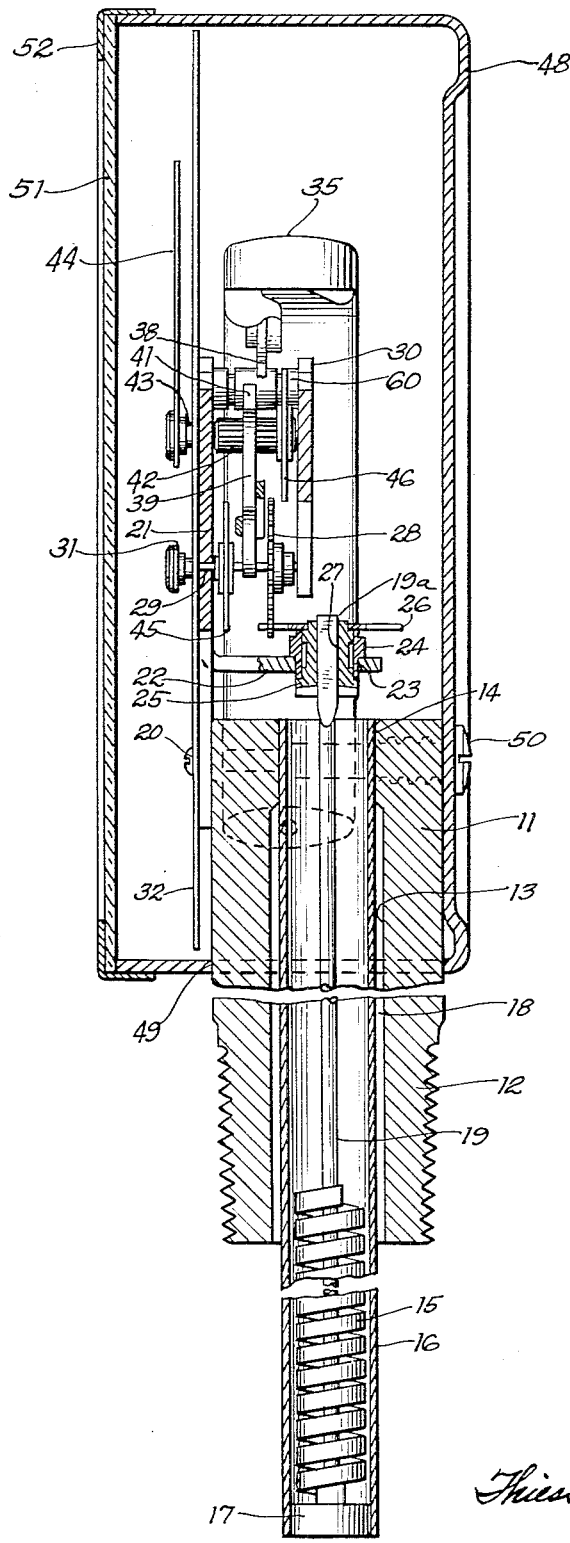
Fig. 1 is a central, vertical, cross-sectional view partially in elevation, of a combined pressure and temperature gauge embodying the present invention.
Figure 3:
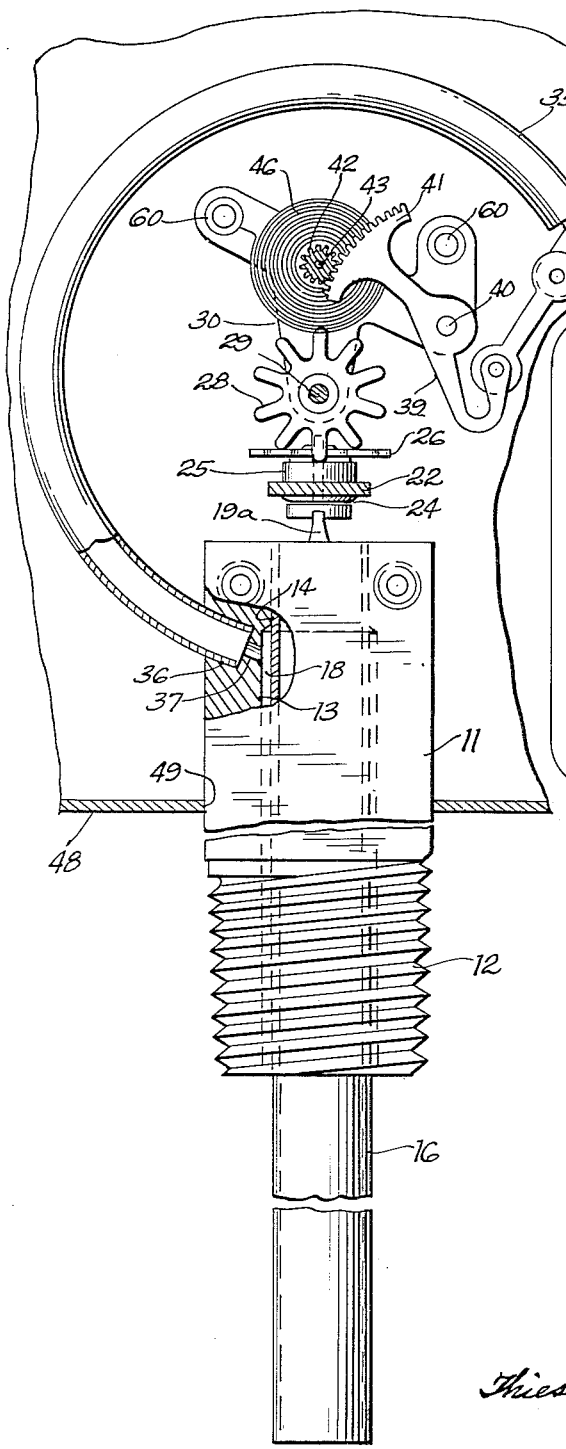
Fig. 3 is a front elevational view, partially in cross section, of the gauge shown in Fig. 1, with the cover, dial, and front plate removed.
Figure 2:
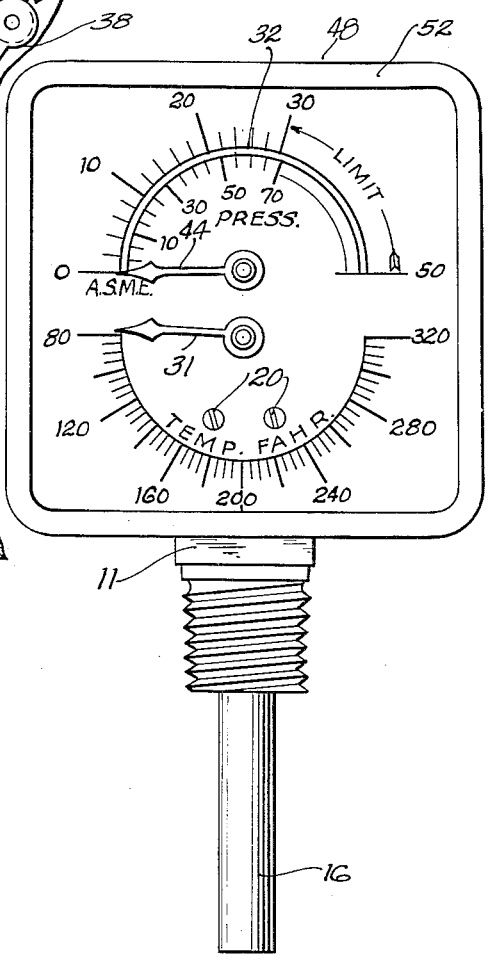
Fig. 2 is a front elevational view of the gauge shown in Fig. 1.

Referring to the drawings and particularly to Figs. 1–3, there is shown a bottom connection type gauge embodying the present invention which comprises a post or nipple 11 on which all of the various gauge elements, including the dial and casing, may be directly secured and by which they are supported. The post 11 is intended to be vertically positioned and is preferably an elongated bar having a lower threaded portion 12 intended for insertion into a complementary threaded opening in a reservoir or tank. A relatively large central opening or chamber 13 extends longitudinally through the post with its inner or upper end 14 preferably of reduced diameter. The opening 13 may be annular, as illustrated, and is preferably centrally located in the post.

Temperature responsive means, such as a bimetallic element 15, is positioned in a tube 16 which may be closed at its lower end by a sealed plug 17. The tube 16 is preferably round as shown in Fig. 1, with an external diameter equal to the internal dimensions of the reduced opening at the upper end 14 of the post so that the open end of the tube may be sealed therein to form a fluid-tight connection. There is thus formed a central, annular passageway 18 between the walls of the chamber 13 and the outer surface of the tube 16 which extends inwardly from the lower end of the post 11 for most of the length of the post.

The upper end of the plug 17 is reduced in diameter and the lower end of the helical bimetallic element 15 is secured thereto by any suitable means. The opposite end of the bimetallic element 15 is connected to a longitudinal shaft 19 rotatably supported at its lower end in a bearing in the upper end of the reduced portion of the plug 17. The longitudinal shaft 19 extends through the tube 16 and projects upwardly therefrom for connection with temperature indicating mechanism.

Mounted on the front side of the post 11 by any suitable means, such as screws 20, is a front plate 21 having a central portion struck out therefrom and bent inwardly to form a shelf 22. The shelf 22 is provided with an opening 23 in which is fixed a bushing 24 provided with an annular collar overlying the shelf 22. Rotatably mounted in the bushing 24 is a gear bushing 25 having an enlarged bottom portion or flange for engaging the lower face of bushing 24. A spur gear 26 is fixed to the top of the gear bushing 25 and rides on the top surface of the bushing 24.

The gear bushing 25 is provided with a central, longitudinal opening 27, substantially oval in cross section, for receiving the upper end 19a of the shaft 19 which is flattened and provided with an oval shape for slidably fitting in the opening 27. This permits longitudinal movement of the shaft 19 with respect to the bushing 25 but prevents relative rotation between the two. Accordingly, any rotation of the shaft 19 due to a change in temperature of the bimetallic element 15 will cause similar rotation of the bushing 25 in gear 26, while permitting longitudinal movement of the shaft 19.

The gear 26 meshes with a similar gear 28 fixed on the horizontal shaft 29. The rear end of the shaft 29 is mounted in a back plate 30 supported by columns 60 on the front plate 21, and the shaft 29 rotates in the plates 21 and 30. An indicator 31 is fixed on the front end of the shaft 29 and overlies a dial 32 secured on the front of the plate 21 by the screws 20 or other suitable means. The gears 26 and 28 are preferably identical and, as illustrated in Fig. 3, are provided with relatively long teeth having parallel sides throughout most of their length.

The pressure responsive element for actuating the pressure indicating element is preferably a Bourdon tube 35 which is secured by soldering or other suitable means in the slot 36 provided in the post 11 adjacent the upper end of the fluid passageway 13. A channel 37 connects the inner end of the Bourdon tube 35 with the fluid passageway 13 so that the Bourdon tube is subjected at all times to the pressure of the fluid in the tank or reservoir upon which the gauge is mounted.

The closed, free end of the Bourdon tube 35 is connected by a link 38 to a lever 39 pivotally mounted about a shaft 40 supported by the front and rear plates 21 and 30. The free end of the lever 39 is provided with an integral gear segment 41 in mesh with a pinion 42 fixed on a shaft 43. The shaft 43 is rotatably mounted in the front and rear plates 21 and 30 and has an indicator 44 fixed on the outer end thereof. The indicator shafts 29 and 43 are provided with usual hair springs 45 and 46, respectively.

The gauge is positioned in a housing 48 provided with an opening 49 in the bottom thereof through which the post 11 extends. Screws 50 which pass through the casing and into tapped openings in the post 11 secure the casing on the post. A glass cover 51 is held on the front of the casing by means of a bezel 52.

The dial 32 as shown in Fig. 2 is marked off to cooperate with the indicator 44 for indicating the pressure and altitude, while the bottom of the dial is also marked off to cooperate with the indicator or hand 31 for indicating the temperature.

While particular embodiments of this invention have been illustrated and described, it will be understood, of course, that the invention is not to be limited thereto, since many modifications may be made, and it is contemplated, therefore, by the appended claims, to cover any such modifications as fall within the true spirit and scope of this invention.

We claim:
1. In a gauge having a post with a longitudinal opening therethrough, a temperature responsive element, a shaft extending through said post connected to said element for rotary and longitudinal movement thereby, and an indicator shaft at an angle to said first shaft with a driven gear thereon, a supporting member positioned inwardly of said post having an opening therein aligned with said shaft, a bushing rotatably mounted in said opening while prevented from axial movement therein, said bushing having a driving gear fixed thereon for meshing with said driven gear and a noncircular axial opening therein, said shaft being shaped to fit said opening and rotate said bushing while being axially movable therein.

2. In a gauge having a post with a longitudinal opening therethrough, a temperature responsive element, a shaft extending through said post connected to said element for rotary and longitudinal movement thereby, and an indicator shaft substantially normal to said first shaft with a driven gear thereon, a supporting member positioned inwardly of said post having an opening therein aligned with said shaft, a bushing fixed in said opening, a second bushing rotatably mounted in said fixed bushing having a flange adjacent one end of said fixed bushing and a gear fixed thereon adjacent the other end of said fixed bushing, said rotary bushing having a noncircular axial opening therein, said shaft being shaped to fit said opening and rotate said bushing while being movable axially therein, and said driving gear meshing with said driven gear.

3. In a gauge having a post for being mounted vertically with a longitudinal opening therethrough, a temperature responsive element, a shaft extending through said post connected to said element for rotary and longitudinal movement thereby, and an indicator shaft substantially normal to said first shaft with a driven gear thereon, a supporting member positioned inwardly of said post having an opening therein aligned with said shaft, a bushing fixed in said opening having an annular collar overlying said supporting member, a second bushing rotatably mounted in said fixed bushing having a flange adjacent the lower end of said fixed bushing and a gear fixed thereon adjacent the upper face of said fixed bushing, said rotary bushing having a noncircular axial opening therein, said shaft being shaped to fit said opening and rotate said bushing while being axially movable therein, and said driving gear meshing with said driven gear.

4. In a gauge having a post with a longitudinal opening therethrough, a temperature responsive element, a shaft extending through said post connected to said element for rotary and longitudinal movement thereby, and an indicator shaft at an angle to said first shaft with a driven gear thereon, a supporting member positioned inwardly of said post having an opening therein aligned with said shaft, a driving gear for meshing with said driven gear rotatably mounted on said support while prevented from axial movement thereon, said driving gear having a noncircular opening therein and said shaft being shaped to fit said opening and rotate said driving gear while being axially movable therein.

References Cited in the file of this patent

UNITED STATES PATENTS

| 943,260 | Lothrop et al. | Dec. 14, 1909 |
| 2,154,426 | Adams | Apr. 18, 1939 |
| 2,266,277 | Seegers et al. | Dec. 16, 1941 |

FOREIGN PATENTS

| 259,312 | Germany | Mar. 5, 1912 |
| 585,966 | Germany | Oct. 13, 1933 |
| 722,063 | Germany | June 29, 1942 |
| 560,398 | Great Britain | Apr. 3, 1944 |